US011846695B2

(12) United States Patent
Ryan et al.

(10) Patent No.: US 11,846,695 B2
(45) Date of Patent: Dec. 19, 2023

(54) RADIO FREQUENCY DISTANCE DETERMINATION

(71) Applicant: Nordic Semiconductor ASA, Trondheim (NO)

(72) Inventors: Daniel James Ryan, Trondheim (NO); Per Erik Sandgren, Trondheim (NO); Carsten Wulff, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 43 days.

(21) Appl. No.: 17/538,834

(22) Filed: Nov. 30, 2021

(65) Prior Publication Data
US 2022/0171047 A1    Jun. 2, 2022

(30) Foreign Application Priority Data

Dec. 1, 2020    (GB) .................................... 2018923

(51) Int. Cl.
*G01S 13/08*    (2006.01)
(52) U.S. Cl.
CPC .................. *G01S 13/08* (2013.01)
(58) Field of Classification Search
CPC .................. G01S 13/08; G01S 5/06
See application file for complete search history.

(56) References Cited

U.S. PATENT DOCUMENTS

| 2011/0309969 | A1* | 12/2011 | Gravelle | G01S 7/285 |
| | | | | 342/130 |
| 2012/0032855 | A1* | 2/2012 | Reede | G01S 13/82 |
| | | | | 370/252 |
| 2018/0341000 | A1* | 11/2018 | Cohen | G01S 13/325 |
| 2020/0288110 | A1* | 9/2020 | Wang | H04N 13/218 |

OTHER PUBLICATIONS

Liao et al., "Music for single-snapshot spectral estimation: Stability and super-resolution," *Applied and Computational Harmonic Analysis*, Jan. 2016, pp. 33-67.

\* cited by examiner

*Primary Examiner* — Timothy A Brainard
*Assistant Examiner* — Kenneth W Good
(74) *Attorney, Agent, or Firm* — Klarquist Sparkman, LLP

(57) ABSTRACT

A method of determining a distance between a radio frequency device and a target is disclosed in which the radio frequency device receives a radio frequency signal from the target. The method comprises determining a time domain channel response from the received radio frequency signal, determining an amplitude of a largest peak in the time domain channel response, determining an amplitude of a second, earlier, peak in the time domain channel response, comparing the second peak amplitude to a threshold based on the largest peak amplitude, identifying the largest peak as a shortest path peak if the second peak amplitude is less than the threshold, identifying the second peak as a shortest path peak if the second peak amplitude is greater than the threshold, and calculating the distance between the radio frequency device and the target based on a time corresponding to the shortest path peak.

14 Claims, 10 Drawing Sheets

RADIO FREQUENCY DISTANCE DETERMINATION

CROSS-REFERENCE TO RELATED APPLICATION

This application claims priority to United Kingdom Patent Application No. GB2018923.9, filed Dec. 1, 2020, which application is incorporated herein by reference in its entirety.

FIELD

The present invention relates to methods for determining a distance between a radio frequency device and a target.

BACKGROUND

It is often useful to estimate the distance between two communicating radio frequency nodes (e.g. between two RF transceivers, or between an RF transceiver and a passive RF reflector). For instance, estimating the distance between two radio frequency devices can be useful for triggering proximity-based actions on one or both of the devices (e.g. to trigger an alert if two devices become too close or too far from one another). This distance can be determined by analysing radio frequency signals traveling between the two nodes.

Conventional approaches to distance estimation using RF signals involve phase-based ranging techniques, in which a radio frequency device transmits a radio signal that is returned from a target and then received back at the radio frequency device. The target may be a passive target such as a wall, or an active target such as a second device arranged to receive and re-transmit an incoming signal. The RF device measures the phase difference, $\phi$, between the transmitted and received signals, which depends on the distance, d, between the device and the target according to:

$$\phi = \left[-\frac{2\pi}{c}fd\right] \bmod 2\pi, \qquad (1)$$

where c is the speed of light and f is the frequency of the transmitted signal. By transmitting a plurality of signals with different frequencies (e.g. by hopping sequentially between a series of carrier frequencies), the distance between the transmitter and the target can be determined by examining the phase difference as a function of frequency for the plurality of signals:

$$\phi_i = -\left[\frac{2\pi}{c}f_i d\right] \bmod 2\pi, \qquad (2)$$

where $\phi_i$ is the phase difference between transmitted and returned signals with frequency $f_i$. The distance, d, between the transmitter and target can thus be determined by plotting phase difference against frequency and measuring the gradient $$\left(\frac{4\pi}{c}d\right).$$

This technique is referred to as Multi Carrier Phase Difference (MCPD) ranging.

However, this approach relies on the assumption that the received signal has followed the shortest path between the transmitter and target. In real environments, however, RF signals follow many different paths (e.g. bouncing off walls, floors and ceilings) between the transmitter and target (and back again). Whilst the greater distance travelled by signals on these alternative paths tends to attenuate their strength relative to signals following the direct (shortest) path, they can still cause uncertainty in phase difference measurements and thus reduce the accuracy of the determined distance. Furthermore, the signals travelling along different paths can interfere, causing frequency-dependent increases and decreases in received signal strength (multi-path effects), further decreasing the accuracy of distance measurements using conventional MCPD approaches. An alternative approach may be desired.

SUMMARY

When viewed from a first aspect, the invention provides a method of determining a distance between a radio frequency device and a target, the method comprising:
 the radio frequency device receiving a radio frequency signal from the target;
 determining a time domain channel response from the received radio frequency signal;
 determining an amplitude of a largest peak in the time domain channel response;
 determining an amplitude of a second, earlier, peak in the time domain channel response;
 comparing the second peak amplitude to a threshold based on the largest peak amplitude;
 identifying the largest peak as a shortest path peak if the second peak amplitude is less than the threshold;
 identifying the second peak as a shortest path peak if the second peak amplitude is greater than the threshold; and
 calculating the distance between the radio frequency device and the target based on a time corresponding to the shortest path peak.

Thus, it will be recognised by those skilled in the art that the distance between the radio frequency device and the target may be determined accurately even if, for example, multi-path interference effects reduce the amplitude of a peak corresponding to the shortest return-trip path or if two or more peaks arising from multiple reflection paths combine to give a higher energy than the genuine signal relating to the shortest return-trip path. The Applicant has thus recognised that the largest peak may not always be the correct one and so in accordance with the invention the second, smaller, peak, which occurs earlier in the time domain channel response (i.e. corresponding to a shorter return-trip path), may still be identified as the shortest path peak if it meets the threshold requirement.

Whilst the time domain channel response (TDCR) may also comprise a number of other peaks that do not correspond to different physical paths (e.g. peaks appearing due to noise, or due to inherent side lobes of peaks in a band-limited TDCR), by basing the threshold on the largest peak amplitude, these can be disregarded to allow a shorter genuine shortest-path peak to be identified if one exists.

In some embodiments, the method only comprises one-way transmission of signals, e.g. wherein the radio frequency signal received from the target is not based on signals transmitted previously from the first radio frequency device and timing or phase information is obtained another way.

However, the method could also comprise two-way transmissions, and therefore in a set of embodiments, the radio frequency signal received from the target is a second radio frequency signal that is based on a first radio frequency signal transmitted previously to the target by the radio frequency device (i.e. where the radio frequency signal is a returned radio frequency signal). In other words, the method may comprise the radio frequency device transmitting a first radio frequency signal and receiving a second radio frequency signal from the target based on the first radio frequency signal.

Thus, the invention extends to a method of determining a distance between a radio frequency device and a target, the method comprising;
the radio frequency device transmitting a first radio frequency signal;
the radio frequency device receiving a second radio frequency signal from the target based on the first radio frequency signal;
determining a time domain channel response from the second radio frequency signal;
determining an amplitude of a largest peak in the time domain channel response;
determining an amplitude of a second, earlier, peak in the time domain channel response;
comparing the second peak amplitude to a threshold based on the largest peak amplitude;
identifying the largest peak as a shortest path peak if the second peak amplitude is less than the threshold;
identifying the second peak as a shortest path peak if the second peak amplitude is greater than the threshold; and
calculating the distance between the radio frequency device and the target based on a time corresponding to the shortest path peak.

Reference to radio frequency signal(s) should be understood to refer to the radio frequency signal received by the radio frequency device and/or the first radio frequency signal transmitted by the radio frequency device (on which the received (second) radio frequency signal is based).

In a set of embodiments the radio frequency signal(s) (i.e. received and/or transmitted by the radio frequency device) comprise a plurality of frequencies, e.g. comprising several different frequency components (where several frequencies are transmitted simultaneously), and/or a sequence of radio frequency signals having different carrier frequencies (i.e. in different frequency channels), for instance transmitted according to a frequency-hopping protocol.

The different frequencies of the radio frequency signal(s) (i.e. received and/or transmitted by the radio frequency device) may be spread substantially evenly over a bandwidth of the radio frequency signal(s) (the bandwidth being the frequency range between highest and lowest frequencies of the radio frequency signal(s)). For instance, the target and/or the radio frequency device may transmit radio frequency signal(s) in a plurality of adjacent or near-adjacent frequency channels (e.g. with 1 MHz or 2 MHz channel spacing). The target and/or the radio frequency device may transmit a plurality of signals with different frequencies in quick succession, e.g. changing frequencies up to 1600 times per second.

The radio frequency signal(s) may comprise a bandwidth of at least 10 MHz, at least 50 MHz, or even up to 100 MHz or more. In one set of embodiments the radio frequency signal(s) comprise a sequence of radio frequency signals with a bandwidth of approximately 74 MHz.

The radio frequency signal(s) (i.e. received and/or transmitted by the radio frequency device) may comprise modulated signals, i.e. comprising information encoded in a carrier wave. In such embodiments the bandwidth of the radio frequency signal(s) comprises the bandwidth of the carrier wave(s). For instance, the radio frequency signal(s) may comprise Bluetooth® signals transmitted according to a frequency-hopping protocol using 1 MHz or 2 MHz carrier frequency channels spaced between 2404 and 2478 MHz. Not all of the frequency channels within the bandwidth may be used.

The target may comprise a second radio frequency device that generates and transmits the radio frequency signal.

However, as mentioned above, in a set of embodiments the radio frequency signal received from the target is a second radio frequency signal that is based on a first radio frequency signal transmitted to the target by the radio frequency device. In some such embodiments, the target may comprise a passive reflector such as a reflective surface (e.g. a wall), such that the second radio frequency signal comprises a reflection of the first radio frequency signal. In other such embodiments, the target may comprise an active transmitter, in which case the second radio frequency signal comprises a re-transmitted signal based on the first radio frequency signal, for instance comprising the same frequency and/or phase (e.g. by synchronising a local oscillator to the received first RF signal). In such embodiments the re-transmitted second radio frequency signal may have the same phase as, or a known phase offset to, the incoming signal. The second radio frequency signal may comprise an amplified version of first RF signal. Alternatively, the second radio frequency signal could simply contain information regarding the first radio frequency signal (e.g. identifying properties such as amplitude or phase of the first radio frequency signal as it was received at the target).

The time domain channel response (TDCR) may be determined using a frequency domain channel response (FDCR) of the received radio frequency signal(s), i.e. comprising a representation of the relative amplitude and phase of signals in different frequency channels. For instance, the incoming radio frequency signal(s) may be Fourier transformed (e.g. using a Fast Fourier Transform process) to produce an FDCR. The FDCR may comprise the output of a Multi-Carrier Phase Distancing (MCPD) process applied to the radio frequency signal(s). The FDCR may then be inverse Fourier-transformed to produce the TDCR, e.g. using an Inverse Fast-Fourier Transform (IFFT) process.

The time domain channel response may comprise a discrete time domain channel response comprising a plurality of discrete time indices (e.g. at least 100, 500, 1000, 2000 or more time indices). In one embodiment the time domain channel response comprises 2048 time points, e.g. determined using a 2048-point IFFT.

In a set of embodiments the threshold corresponds to an amplitude larger than a side-lobe amplitude of the largest peak. In a band-limited TDCR, each path may appear as a sinc function with primary peak and several adjacent side-lobe peaks with relative amplitudes determined by the shape of a sinc function. The first side-lobe peak (i.e. a secondary peak) in a perfect sinc function has an amplitude of −13.3 dB relative to the primary peak. In some embodiments, the threshold comprises an amplitude larger than −13.3 dB relative to the amplitude of the largest peak (approximately 5%). In one set of embodiments the threshold comprises an amplitude of −10 dB (10%) relative to the amplitude of the largest peak (e.g. to account for noise and other imperfections).

The distance between the radio frequency device and the target may be calculated by determining the distance travelled by an RF signal in a time, $t_{sp}$, corresponding to the shortest path peak (i.e. the position in the time domain channel response at which the shortest path peak lies). In other words, the distance, d, between the radio frequency device and the target may be determined according to:

$$d = t_{sp} \cdot c, \qquad (3)$$

or, where a discrete time domain channel response is used:

$$d = \frac{n_{sp}}{N} \cdot \frac{c}{\Delta f}, \qquad (4)$$

where $n_{sp}$ is the time point at which the shortest path peak lies, N is the total number of time points, and $\Delta f$ is the minimum spacing of frequencies in the received signal.

However, in some embodiments, the time of the shortest path peak may not accurately represent the shortest path between the RF device and the target. For instance, if a signal takes an alternative path that is only slightly longer than the shortest path and which has a comparable amplitude to the signal following the shortest path, the shortest path peak appearing in the time domain channel response may actually represent two (or more) overlapping peaks, only one of which actually corresponds to the shortest path. For instance, in a bandlimited TDCR with a bandwidth BW, the Rayleigh criterion (which denotes the minimum time separation of two paths that can both be individually resolved in the TDCR) is equal to $$\frac{1}{BW}.$$

Peaks closer than this may overlap, thus obscuring their individual positions. The Rayleigh criterion corresponds to the expected time separation between a peak and its closest local minimum. In such a situation, using the time of the shortest path peak to determine the distance may be inaccurate.

Thus, in some sets of embodiments the method further comprises:
- identifying a closest local minimum in the time domain channel response earlier than the shortest path peak;
- determining a time separation between the closest local minimum and the shortest path peak;
- comparing the time separation to an expected time separation based on a bandwidth of the received radio frequency signal; and
- if the time separation is greater than the expected time separation, calculating said time corresponding to the shortest path peak as a time corresponding to the closest local minimum plus the expected time separation.

In other words, the method may comprise checking if the most recent local minimum before the shortest path peak is located at a time that would be expected for a single peak in a bandwidth-limited time domain channel response, or if it is located at another position which suggests that the shortest path peak is actually made up of two (or more) overlapping peaks. If the closest local minimum is separated from the shortest path peak by longer than would be expected, a corrected time to be used for distance determination that is closer to the actual time of the shortest path between the RF device and the target is calculated by adding the expected time separation to the time of the local minimum (as this is where the corresponding peak to that minimum should lie).

The expected time separation may comprise the Rayleigh criterion for the TDCR, equal to $$\frac{1}{BW}.$$

In a discrete time domain channel response the expected time index separation may be equal to:

$$\frac{N_{IFFT}\Delta f}{BW}. \qquad (5)$$

Thus, in some such embodiments the time corresponding to the shortest path peak to be used for determining the distance between the RF device and the target may be calculated as:

$$n_{corrected} = n_{locmin} + \frac{N_{IFFT}\Delta f}{BW} \qquad (6)$$

such that the distance d between the RF device and the target (using equation 4) is given by:

$$d = \frac{n_{locmin}}{N_{IFFT}} \frac{c}{\Delta f} + \frac{c}{BW} \qquad (7)$$

The closest local minimum in the time domain channel response earlier than the shortest path peak may comprise the most recent time in the TDCR (e.g. the most recent time index in a discrete TDCR) having an amplitude that is less than the amplitude at times immediately before and afterward (i.e. a strict mathematical definition of a local minimum). For a discrete TDCR this may be expressed as the most recent time in the TDCR at which:

$$h_{mag}[n_{locmin} - 1] > h_{mag}[n_{locmin}] < h_{mag}[n_{locmin} + 1], \qquad (8)$$

where $h_{mag}[n]$ is the amplitude of a the TDCR at time index n.

However, in some situations, noise and/or other imperfections can produce spurious small variations in the TDCR including artificial local minima. In such situations using a strict mathematical definition of a local minimum can lead to errors. In some sets of embodiments, the closest local minimum may be identified from a smoothed version of the TDCR (e.g. a moving average of the TDCR), to reduce the impact of random noise. Additionally or alternatively, local minima in the TDCR may be disregarded if they are insufficiently pronounced, i.e. if the depth of a local minimum in the TDCR smaller than a threshold (e.g. defined relative to an amplitude of the largest peak).

In some embodiments, the closest local minimum in the time domain channel response earlier than the shortest path peak may be defined by a heuristic definition that allows for noise and other imperfections. For instance, the following criteria may be used to identify the closest local minimum:

$h_{mag}[n_{locmin}] < h_{mag}[n_{sp}] \cdot T_1$, where $T_1 < 1.0$, e.g., $T_1 = 0.5$;  a)

$h_{mag}[n_{locmin}] < h_{mag}[n_{locmin} - 1] \cdot T_2$, where $T_2 > 1.0$, e.g., $T_2 = 1.1$;  b)

$h_{mag}[n_{locmin}] < h_{mag}[n_{sp}] \cdot T_3$, where $T_3 \gg 1.0$, e.g., $T_3 = 10.0$.  c)

Where the closest local minimum is the closest earlier time in the TDCR in which both conditions a) and b) are fulfilled, or in which condition c) is fulfilled.

The distance between the radio frequency device and the target may be determined by the radio frequency device itself, e.g. by a processor of the radio frequency device. However, in some embodiments one or more steps may be carried out on another device (e.g. by a processor of an active reflector, or by a remote server).

From a second aspect the invention provides a radio frequency transceiver device arranged to:
  receive a radio frequency signal from a target;
  determine a time domain channel response from the radio frequency signal;
  determine an amplitude of a largest peak in the time domain channel response;
  determine an amplitude of a second, earlier, peak in the time domain channel response;
  compare the second peak amplitude to a threshold based on the largest peak amplitude;
  identify the largest peak as a shortest path peak if the second peak amplitude is less than the threshold;
  identify the second peak as a shortest path peak if the second peak amplitude is greater than the threshold; and
calculate the distance between the radio frequency device and the target based on a time corresponding to the shortest path peak.

This aspect of the invention extends to a radio frequency transceiver device arranged to:
  transmit a first radio signal;
  receive a second radio frequency signal from a target based on the first radio frequency signal;
  determine a time domain channel response from the second radio frequency signal;
  determine an amplitude of a largest peak in the time domain channel response;
  determine an amplitude of a second, earlier, peak in the time domain channel response;
  compare the second peak amplitude to a threshold based on the largest peak amplitude;
  identify the largest peak as a shortest path peak if the second peak amplitude is less than the threshold;
  identify the second peak as a shortest path peak if the second peak amplitude is greater than the threshold; and
calculate the distance between the radio frequency device and the target based on a time corresponding to the shortest path peak.

Features of any aspect or embodiment described herein may, wherever appropriate, be applied to any other aspect or embodiment described herein. Where reference is made to different embodiments, it should be understood that these are not necessarily distinct but may overlap.

BRIEF DESCRIPTION OF DRAWINGS

One or more non-limiting examples will now be described, by way of example only, and with reference to the accompanying figures in which:

FIG. 10 is a magnified view of the time domain channel response shown in

DETAILED DESCRIPTION OF EMBODIMENTS

Figure 1:
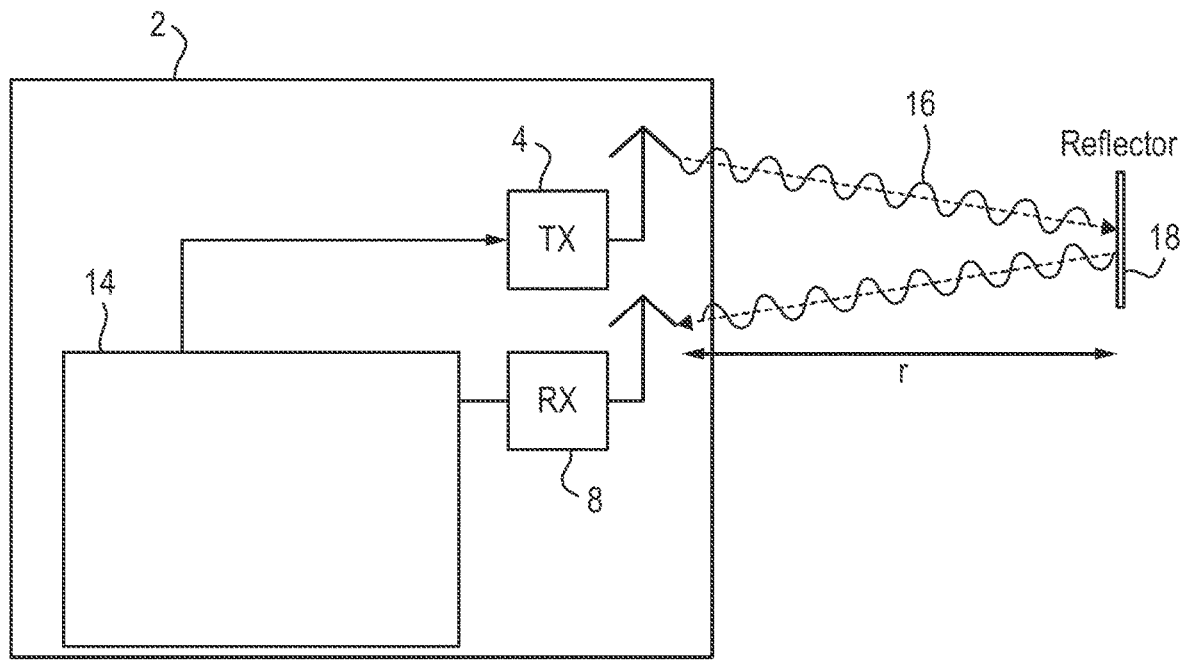
FIG. 1 is a schematic diagram of an arrangement for use in embodiments of the present invention.

FIG. 1 shows a radio frequency (RF) device 2 comprising a transmitter 4, a receiver 8, and a processor 14. The RF device 2 is located a distance r from a passive reflector 18. In use, the transmitter 4 transmits a sequence of radio frequency signals 16 with different carrier frequencies (e.g. following a predetermined frequency-hopping pattern). The radio frequency signals 16 are reflected by the reflector 18 and received by the receiver 8. The received radio frequency signals 16 may be used to estimate the distance r between the RF device 2 and the reflector 1, as described in more detail below with reference to FIGS. 3-8.

Figure 2:
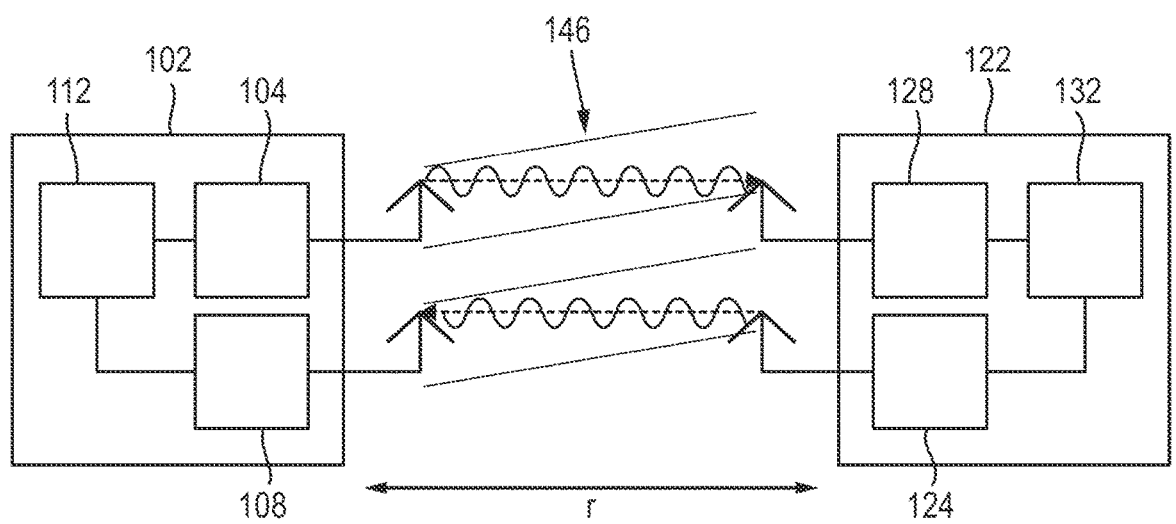
FIG. 2 is a schematic diagram of another arrangement for use in embodiments of the present invention.

FIG. 2 shows another arrangement featuring a first RF device 102 and a second RF device 122, separated by a distance, r. The first RF device 102 comprises a transmitter 104, a receiver 108 and a processor 112. The second RF device 122 also comprises a transmitter 124, a receiver 128 and a processor 132.

In use, the transmitter 104 of the first RF device 102 transmits a sequence of radio frequency signals 146 with different carrier frequencies (e.g. following a predetermined frequency-hopping pattern). The radio frequency signals 146 are received by the receiver 128 of the second RF device 122, and then re-transmitted by the transmitter 124 (i.e. acting as an active reflector). For instance, the second RF device 122 may comprise a local oscillator that is locked to the frequency of the received radio frequency signals 146 (thus being locked to the same frequency as a local oscillator of the first RF device 102). The re-transmitted (i.e. reflected) signals 146 are then received by the receiver 108 of the first RF device 102.

As with the arrangement shown in FIG. 1, the received radio frequency signals 146 may be used to estimate the distance r between the first and second RF devices 102, 122, as described in more detail below with reference to FIGS. 3-8.

A method of determining the distance, r, between an RF device (e.g. the RF device 2 in FIG. 1, or the first RF device 102 in FIG. 2) and a target (e.g. the passive reflector 18 in FIG. 1, or the second RF device 122 acting as an active reflector in FIG. 2) will now be described with reference to FIGS. 3-5. A further improvement on this method is then described with reference to FIGS. 6-10.

In this example, in step 150, the RF device transmits a sequence of RF signals (i.e. signals 16, 146 in FIGS. 1 and 2) in different frequency channels spaced at 2 MHz intervals between 2404-2478 MHz. This means the RF signals have a total bandwidth BW of 74 MHz.

These signals are returned by the target and received back at the RF device in step 152. The received signals have a frequency-dependent amplitude and phase that depends (amongst other things) upon the distance, r, between the RF device and the target.

The received signals are analysed (e.g. by the processors 14, 112) to produce a frequency domain channel response (FDCR), $H(j\omega)$, which is a representation of the relative amplitude and phase of the received signals across the different frequency channels. The FDCR may be produced by Fourier-transforming a time-series of the received signals (e.g. using a Fast Fourier Transform (FFT) technique). The FDCR may be produced by performing a Multi-Carrier Phase Distancing (MCPD) procedure on the received signals. This may enable both one-way and two-way ranging.

Two-Way Ranging

In one example of two-way ranging (2WR), the local oscillators (LOs) of two RF devices, an initiator and a reflector, are locked. The LOs are not assumed to be phase-locked so there exists a time offset $\Delta T$ which results in a channel dependent phase offset $\theta_{LO}=\omega_{LO}\Delta T$ between the two LOs. We can describe the initiator's LO instantaneous carrier phase as $\omega_{LO}t$ and the reflector's as $\omega_{LO}(t+\Delta_T)$.

The initiator first sends a tone $\omega_{LO}t$, and the receiver gets $\omega_{LO}t-\omega_{LO}r/c$, which it then down mixes to baseband and measures the phase (Step 1). In Step 2, the reflector then sends $\omega_{LO}(t+\Delta_T)$ and the initiator measures the received baseband phase. Note that the LOs are kept on during Step 1 and Step 2, but each side changes roles in between. The devices can then exchange the measured phase values ($\psi_I$, $\psi_R$) by a data channel to perform a distance measurement.

TABLE 1

2WR phase measurement on a single tone

| | Initiator TX RF | Reflector RX RF | Reflector RX BB |
|---|---|---|---|
| Step 1 | $\omega_{LO}t$ | $\omega_{LO}t - \omega_{LO}r/c$ | $\psi_R = -\omega_{LO}\Delta_T - \omega_{LO}r/c$ |
| Step 2 | Reflector TX RF | Initiator RX RF | Initiator RX BB |
| | $\omega_{LO}(t + \Delta_T)$ | $\omega_{LO}(t + \Delta_T) - \omega_{LO}r/c$ | $\psi_I = \omega_{LO}\Delta_T - \omega_{LO}r/c$ |
| Step 3 | Reflector sends | | Initiator calcs |
| | $\psi_R$ | | $\psi = \psi_R + \psi_I$ |
| | $-\omega_{LO}\Delta_T - 2\pi r/c$ | | $\psi = -2\omega_{LO}r/c$ |

Figure 14:
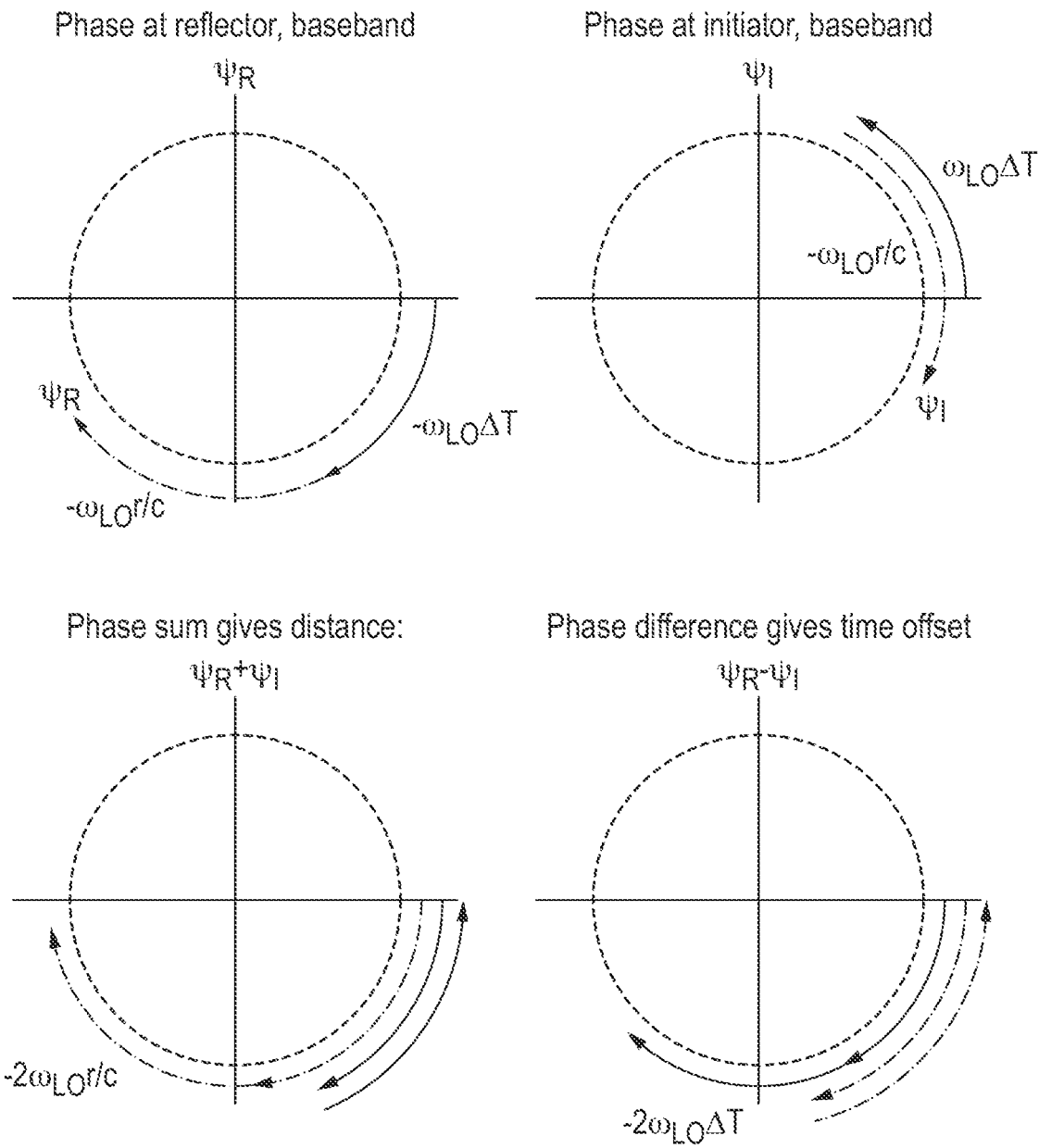
FIG. 14 illustrates phase differences for an example of two-way ranging.

This is shown in Table 1 and also FIG. 14. We can see that if we take the sum of the received phases, we get something which is a function of the distance, and the time offset between the devices is cancelled out. Conversely, if we take the difference of the received phases, we get something which is a function of the time offset between the devices.

We see that the initiator and receiver's phase measurement ($\psi_I$, $\psi_R$) are equally offset by the distance, but are offset in opposite directions because of the LO phase offset between devices $$\psi_I = \omega_{LO}\Delta_T - \omega_{LO}r/c$$
$$\psi_R = -\omega_{LO}\Delta_T - \omega_{LO}r/c$$

So we have $$\phi_{dist} = \psi_I + \psi_R = -2\omega_{LO}r/c$$
$$\phi_{\Delta_T} = \psi_I - \psi_R = -2\omega_{LO}\Delta_T$$

From which we can measure the distance and the time offset. In reality $\phi_{dist}$ will be disturbed by an additional phase offset due to each device's internal delays. As long as these are constant during a sweep over the band they have no effect.

To generate the FDCR, i.e. the channel response $\tilde{H}(f_k)$, we assume the I and Q values of the reflector and initiator are given by $$PCT_{REFL}(f_k) = A_{REFL}(f_k)e^{i\theta_{REFL}(f_k)} \text{ and } PCT_{INIT}(f_k) = A_{INIT}(f_k)e^{i\theta_{INIT}(f_k)}$$

Where $f_k$ is the kth channel.

Assuming the physical channel is symmetrical between initiator and reflector then the measured phases are dependent on both the physical communication channel as well as the relative difference in phase of the RF carrier between the devices i.e. that $\theta_{REFL}(f_k)=\theta_{CH}(f_k)+\Delta\theta_{LO}(f_k)$ and $\theta_{INIT}(f_k)=\theta_{CH}(f_k)-\Delta\theta_{LO}(f_k)$ where $\theta_{CH}(f_k)$ is the phase delay of the channel, and $\Delta\theta_{LO}(f_k)$ is the relative difference in phase of the RF carrier between the devices An estimate of the square of the actual channel response $\tilde{H}(f_k)$ is made e.g.

$$\tilde{H}^2(f_k) = A_{REFL}(f_k)e^{i\theta_{REFL}(f)} \times A_{INIT}(f)e^{i\theta_{INIT}(f)} = A_{CH}^2(f)e^{i2\theta_{CH}(f)}$$

From $\tilde{H}^2(f_k)$, can construct an estimate of the actual channel transfer function $H(f_k)$. Unfortunately both $\tilde{H}(f_k)=\sqrt{\tilde{H}^2(f_k)}$ and $-\sqrt{\tilde{H}^2(f_k)}$ are valid solutions. To determine the correct solution one may for example assume to minimize the Euclidean distance between successive values in $\tilde{H}(f_k)$, or use other means based on assumption of phase coherence of the PLL between different frequencies.

One-Way Ranging (1WR)

In 1WR all events happen on a timing grid, such that $\Delta_\tau$ is kept constant over the full channel sweep.

TABLE 2

| | 1WR in multipath | |
|---|---|---|
| Step n | Initiator TX RF $e^{j\omega_{LO}t}$ | Reflector RX RF $H(j\omega_{LO})e^{j(\omega_{LO}t)}$ | Reflector RX BB $y_R = H(j\omega_{LO})e^{-j(\omega_{LO}\Delta_T)}$ |

So we need to estimate $\Delta_T$. This can be done using a set of 2WR measurements as explained above.

$$y_R = H(j\omega_{LO})e^{-j\omega_{LO}\Delta_T}$$
$$y_I = H(j\omega_{LO})e^{j\omega_{LO}\Delta_T}$$

And therefore $$\angle(y_R^* y_I) = 2\omega_{LO}\Delta_T$$

So we can measure $\Delta_T$ by looking at the slope of $\angle(y_R^*y_I)$ over frequency. This slope is still a straight line in the presence of multipath. One way ranging may require highly accurate frequency correction, with the LO and CLK frequencies are tied together.

Figure 3:
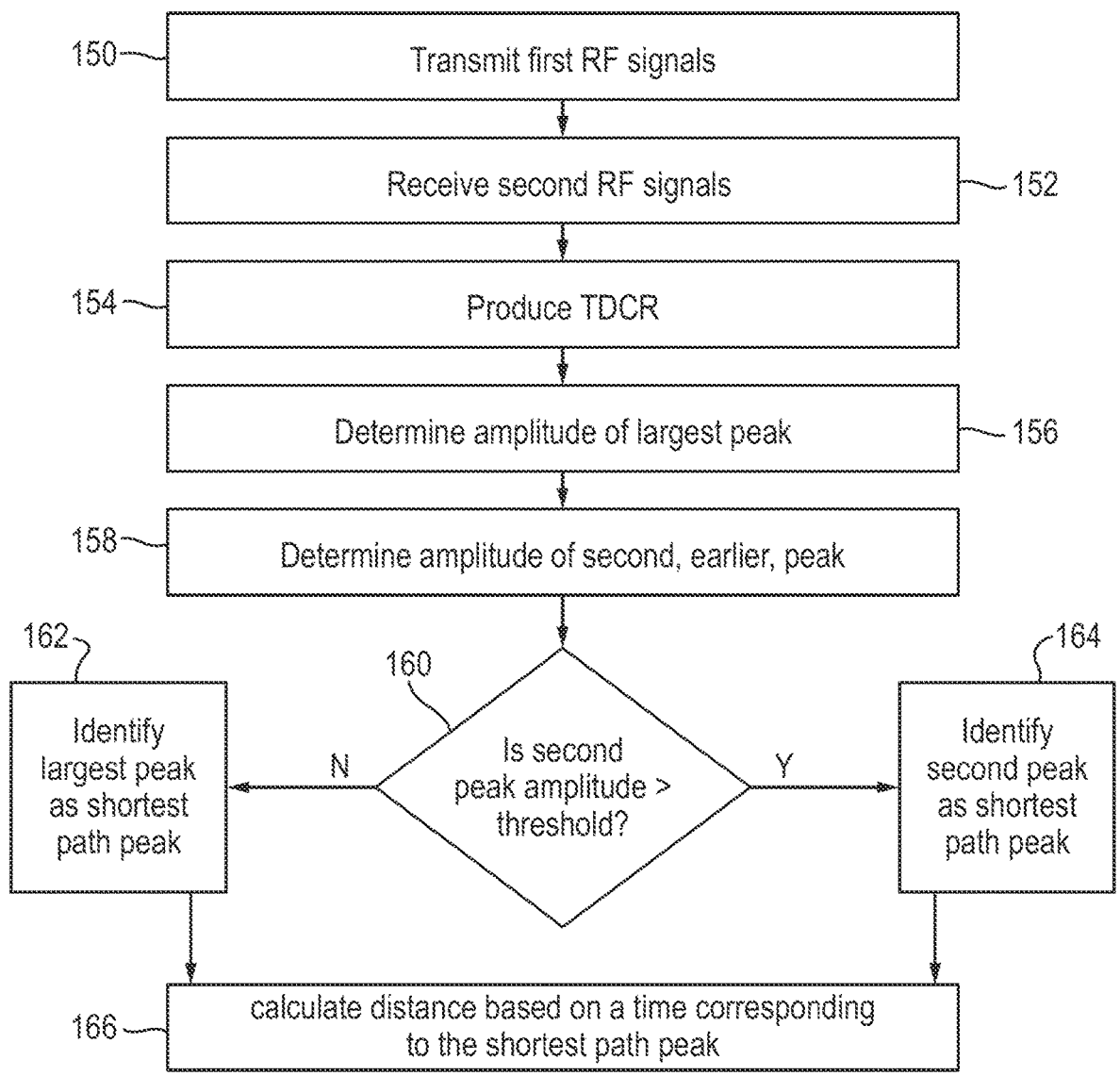
FIG. 3 is a flow diagram illustrating a method according to an embodiment of the present invention.
Figure 4:
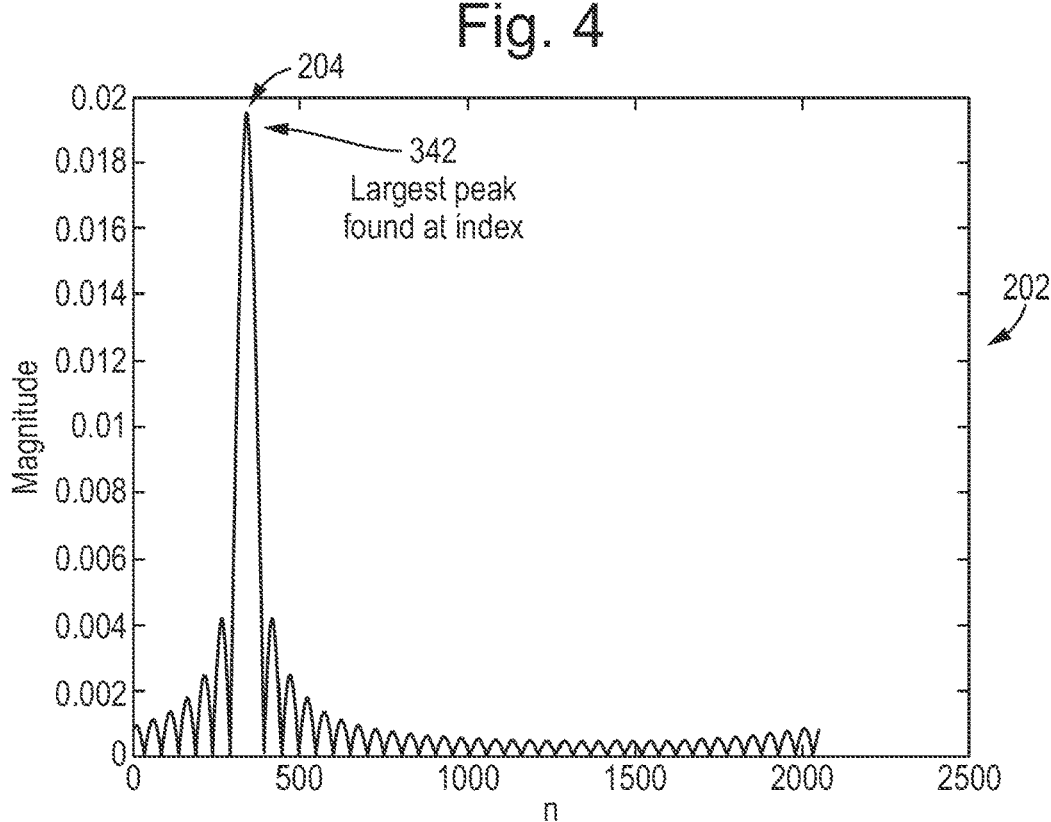
FIG. 4 shows a simulated time domain channel response for signals sent between an RF device and a target without multipath effects.
Figure 5:
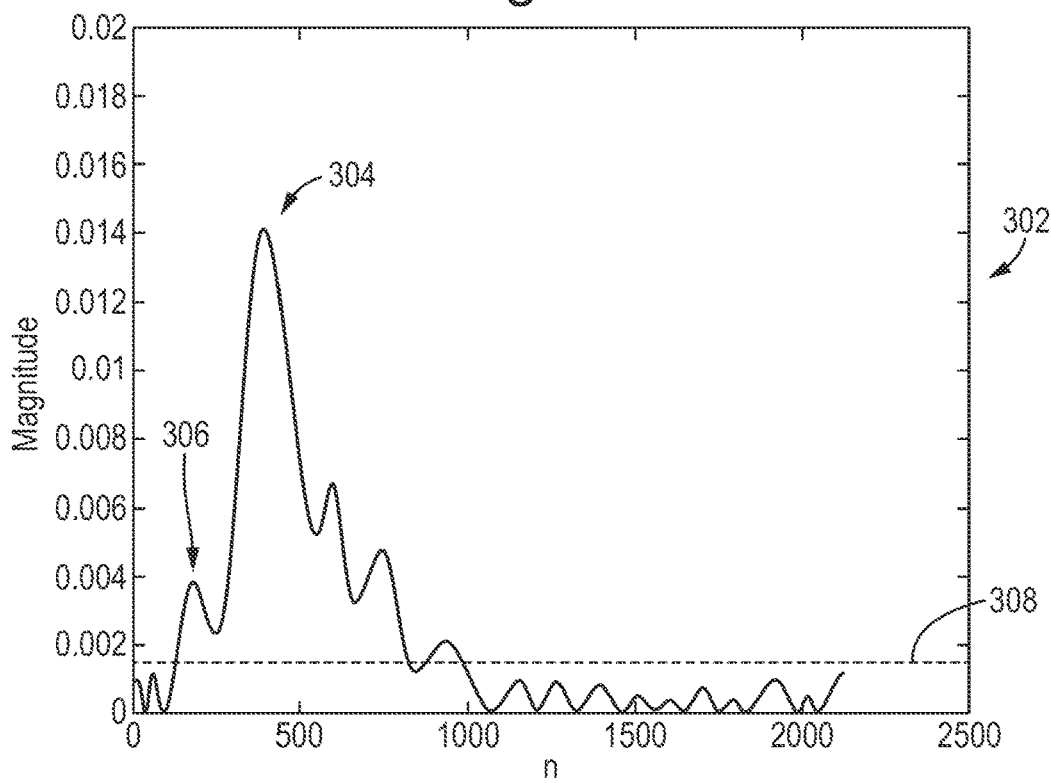
FIG. 5 illustrates a time domain channel response for signals sent between an RF device and a target with multipath effects.

This fine frequency measurement can be done by measuring on the same frequency on many tones spread over a large amount of time Returning now to the two-way method illustrated in FIGS. 3-5, once produced, the FDCR is then inverse-Fourier transformed using a 2048-point Inverse Fast Fourier Transform (IFFT) technique to produce a time domain channel response (TDCR), |h(t))| in step 154.

FIG. 4 shows the TDCR 202 for a simulated situation in which the RF device and the target are separated by 25 m and where there are no multipath effects. The largest peak 204 in the TDCR is found at time index $n_{peak}$=342. Because there are no multi-path effects, the distance between the RF device and the target can therefore be calculated using the time index of the largest peak 204 according to:

$$d_{est} = \frac{n_{peak}}{N_{IFFT}} \cdot \frac{c}{\Delta f} = 25.05 \text{ m},$$

which is only 0.05 m away from the true distance (this error is only due to the resolution of the IFFT).

However, in real-world situations multi-path effects can cause frequency-dependent increases and decreases in received signal strength. In some such scenarios the largest peak in the TDCR may thus not actually represent the shortest path between the two radio nodes (i.e. the largest peak may not be the "shortest path peak").

A more realistic TDCR 302 is shown in FIG. 5, for a simulated situation in which the RF device and the target are separated by 11.5 m and there are realistic multi-path effects. In step 156, the amplitude of the largest peak 304 is determined to be approximately 0.014 and at a time index of $n_{largestpeak}$~400 which corresponds to a distance of approximately 29 m, i.e. 17.5 m away from the true distance.

Thus, simply using the largest peak 304 may not be particularly accurate in a situation where multi-path effects are significant. To improve the accuracy of the distance estimation, in step 158 the next highest peak 306 which has an earlier time index in the TDCR is selected and analysed to determine if it corresponds to a shorter path between the RF device and the target.

Because the TDCR 302 is derived from a bandlimited FDCR (i.e. limited by the bandwidth of the transmitted radio frequency signals), peaks in the TDCR 302 corresponding to paths between the RF device and the target appear as sinc functions with a first sidelobe peak having a amplitude of approximately −13.3 dB compared to the main peak (i.e. approximately 4.7%. of the amplitude of the main peak). Thus, the first side lobe peaks in the TDCR 302 for the largest peak 304 would be expected to have a amplitude of approximately 0.0007.

Therefore, to determine whether the earlier peak 306 in the TDCR 302 actually corresponds to a shorter path between the RF device and the target than that corresponding to the largest peak 304, or if it is just a side lobe of the largest peak 304, in step 160 a threshold test is used where the earlier peak 306 is compared to a threshold 308 based on the amplitude of the largest peak 304. The threshold 308 has a amplitude of −10.0 dB compared to the largest peak 304 (i.e. 10% or approximately 0.0014), i.e. greater than the expected amplitude of the first side lobe of −13.3 dB (two times greater). If the amplitude of the earlier peak 306 is lower than the threshold, the largest peak is identified as the shortest path peak in step 162. However, as can be seen in FIG. 5, the amplitude of the earlier peak 306 is greater than the threshold 308 and it is thus identified as the shortest path peak in step 164.

Once the shortest path peak 306 has been identified, it can be used to determine the distance, r, between the RF device and the target with greater accuracy than simply using the largest peak 304. The distance between the RF device and the target can be determined in step 166 by simply using the time index of the shortest path peak in conjunction with equation (4). For the example shown in the FIG. 5, the shortest path peak 306 lies at a time index $n_{sp}$ of approximately 170, which corresponds to a distance of approximately 12.5 m, i.e. an error of only 1 m.

However, the accuracy of the distance estimation may still be improved. Because the TDCR 302 is bandlimited, individual peaks corresponding to similar length paths may overlap, such that a single peak in the TDCR 302 may not actually correspond to a single path. In this embodiment, where the bandwidth, BW, of the transmitted signals is 74 MHz, the Rayleigh criterion (which denotes the minimum time separation of two paths that can both be accurately individually resolved in the TDCR) is equal to $$\frac{1}{BW} = 13.5 \text{ ns.,}$$

corresponding to a distance of approximately 4.05 m.

Figure 6:
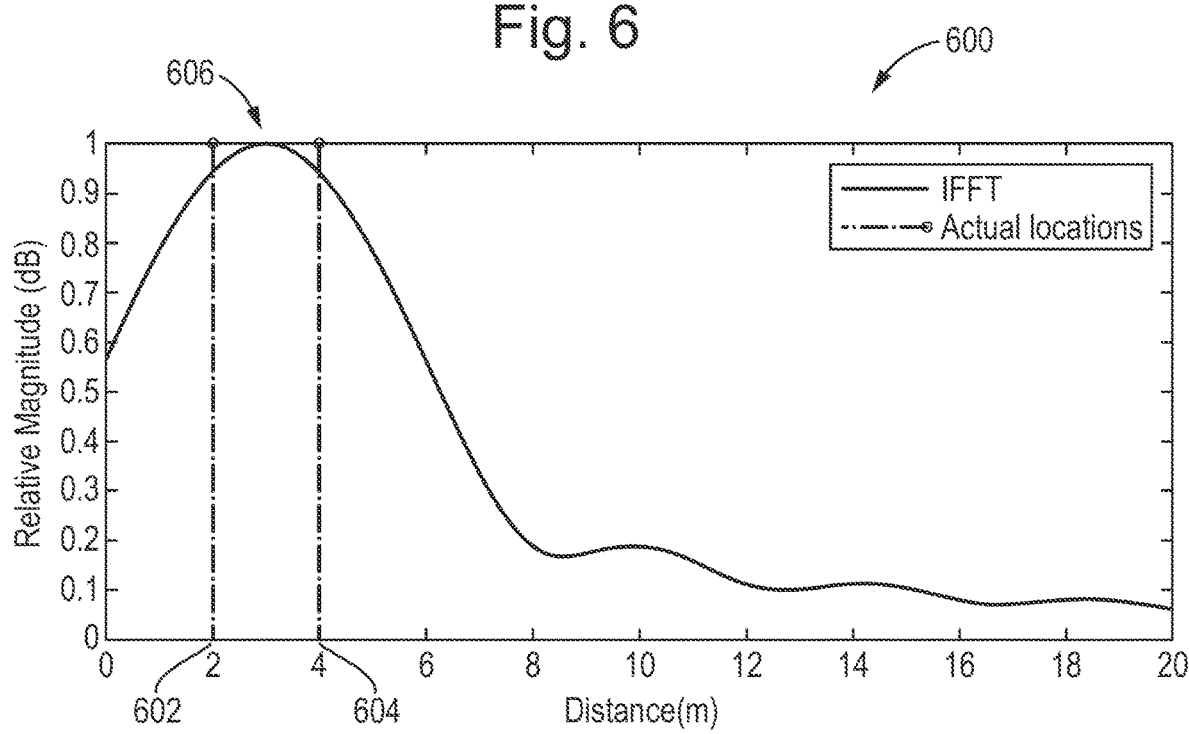
FIGS. 6-8 illustrate time domain channel responses containing two incoming paths of equal strength with a various different separations.
Figure 7:
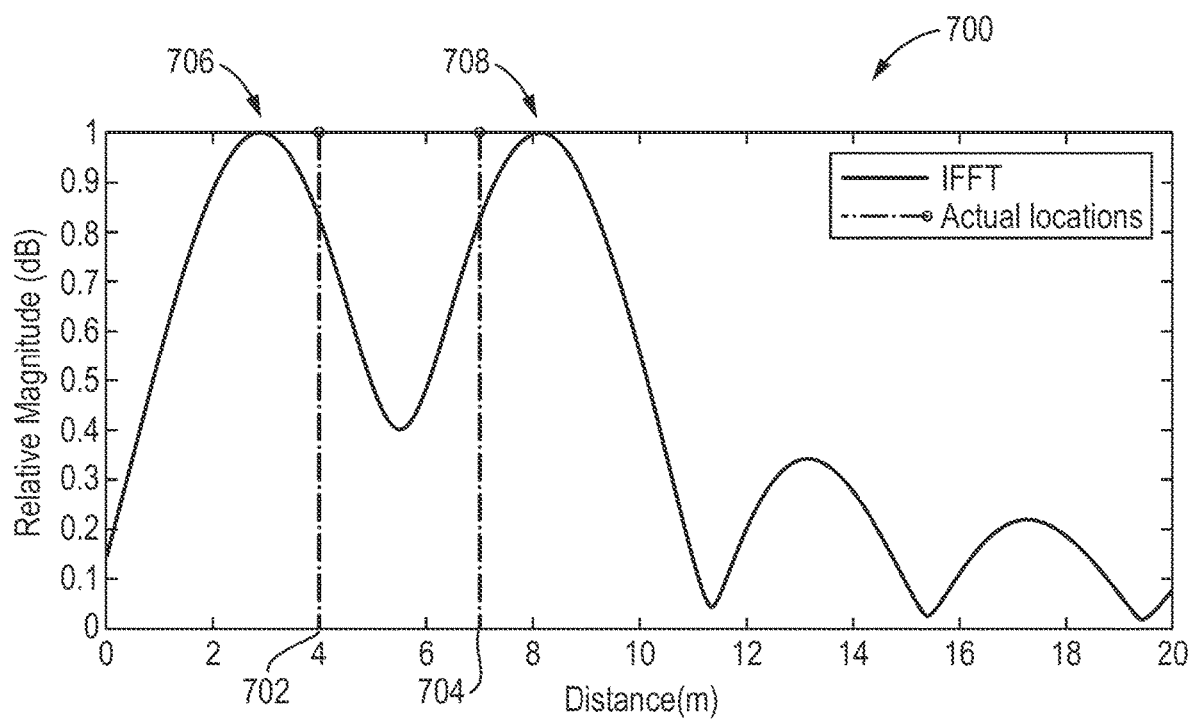
Figure 8:
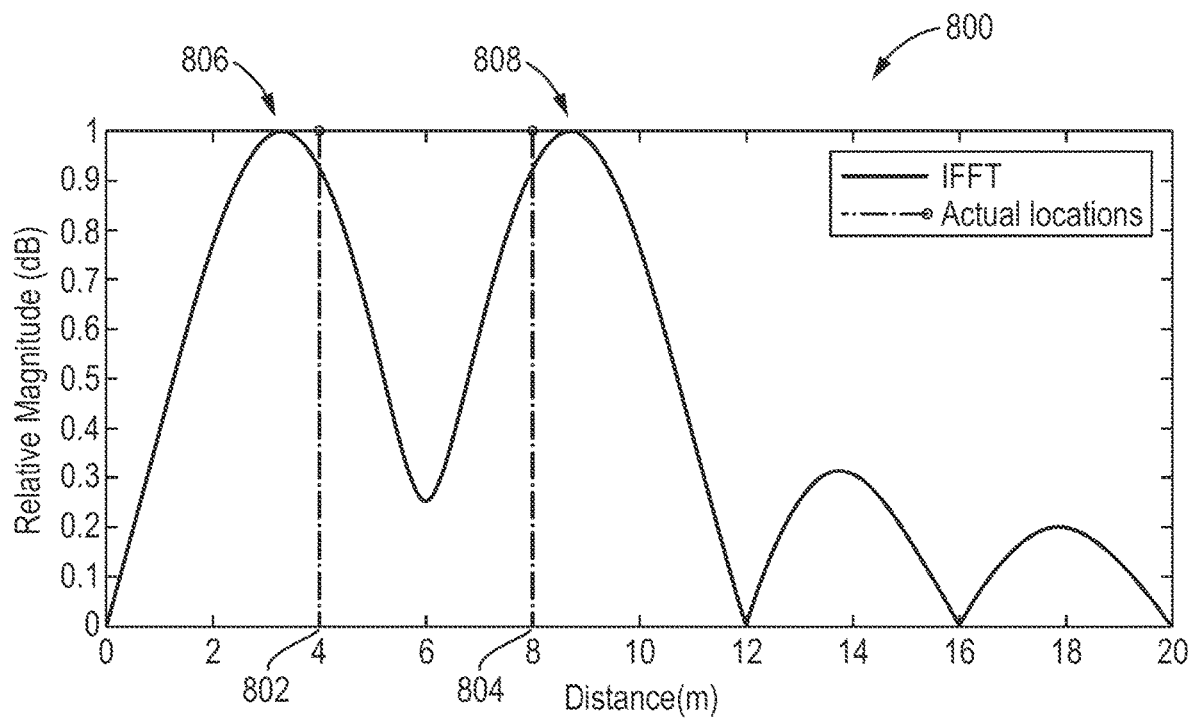
Figure 9:
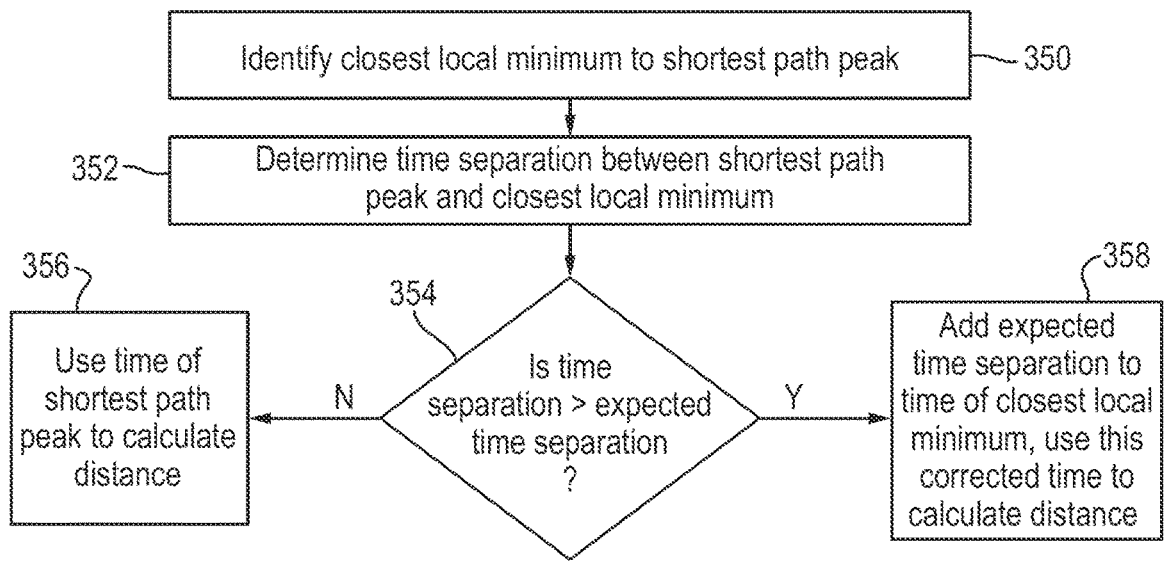
FIG. 9 is a flow diagram illustrating steps of a method according to an embodiment of the present invention.

The uncertainty introduced when two paths are closely separated is illustrated in FIGS. 6-8. FIG. 6 shows a TDCR 600 (in which the x-axis has been converted to distance for clarity) for a situation in which two paths 602, 604 of equal strength are separated by 2 m, i.e. roughly half the Rayleigh distance of 4.05 m (all the other parameters of the TDCR are the same as that described above). Only one peak 606, located at 3 m, is visible in the TDCR. FIG. 7 shows a TDCR 700 for a situation in which two paths 702, 704 are separated by 3 m, i.e. roughly 0.75 of the Rayleigh distance. Two separate peaks are visible in this TDCR, but they are still located roughly 1 m away from the true path distances. FIG.

8 shows a TDCR 800 for a situation in which two paths 802, 804 are separated by 4 m, i.e. roughly equal to the Rayleigh distance. In this example the peaks 802, 804 are still roughly 70 cm away from the true path distances.

Therefore, in order to further improve the accuracy of the distance determination, the shortest path peak 306 is further analysed to ascertain whether it is the actually the produce of two different paths. This process will now be explained with reference to the flowchart of FIG. 9 and with reference to FIG. 10, which is a magnified view of the TDCR shown in FIG. 5.

Figure 10:
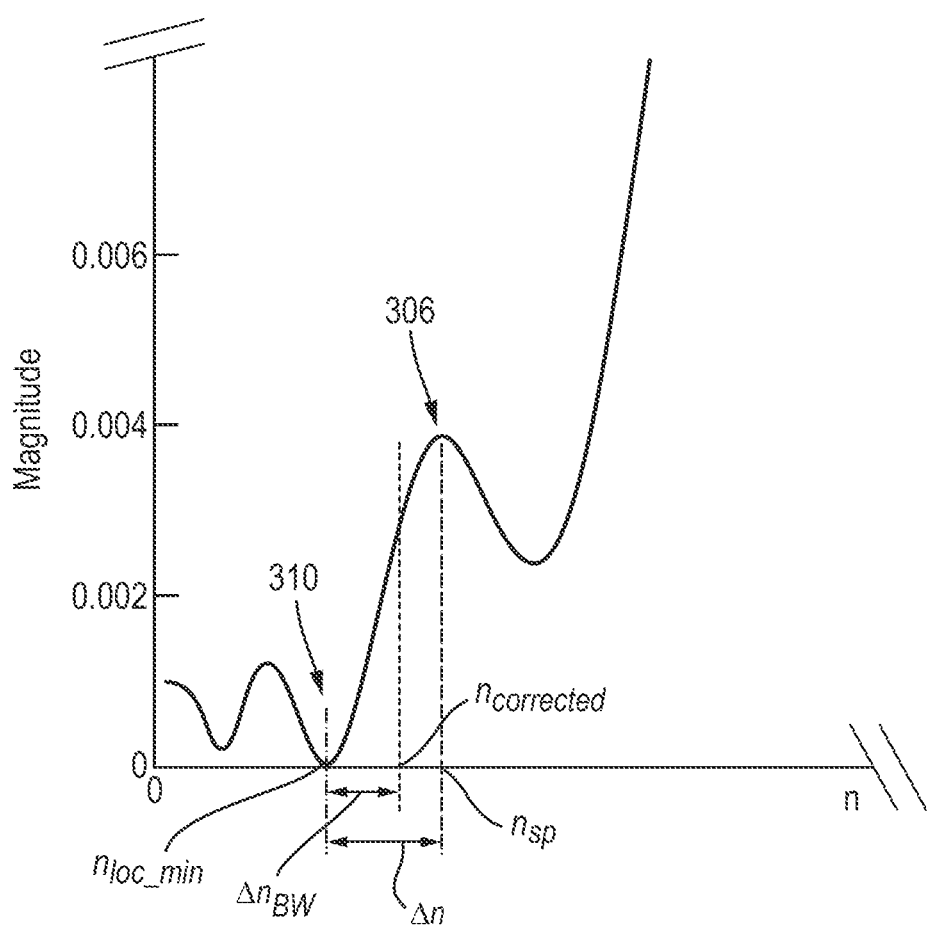

In step 350 a closest local minimum 310 in the TDCR of FIG. 10 earlier than the shortest path peak 306 (i.e. at a lower value of n) is identified. In step 352 a time separation Δn between the shortest path peak 306 and the closest local minimum 310 is then determined. In step 354 this time separation is compared to the separation $\Delta n_{BW}$ which would be expected to be observed if the closest local minimum 310 was simply the first null of the shortest path peak 306 (i.e. the first null of the sinc function that describes peaks in the TDCR).

In this example the expected separation $\Delta n_{BW}$ (calculated using equation 5) is 55 time index units. If the time separation is less than the expected separation, the time of the shortest path peak 306 would be used to calculate the distance to between RF device and the target in step 356. However, in this is example, the local minimum 310 is located at n=100, such that the time separation Δn measured between the shortest path peak 306 and the closest local minimum 310 is Δn=70. The time separation Δn is greater than the expected time separation $\Delta n_{BW}$ which suggests that the shortest path peak 306 is actually made up of two overlapping peaks. To determine the time index of the earlier of these two peaks (i.e. corresponding to the shortest path), the expected time separation $\Delta n_{BW}$ is simply added on to the time index of the local minimum 310 (as this is where the corresponding peak to that minimum should lie) in step 358 to produce a corrected time index $n_{corrected}$=155, which is used to calculate a distance (using equation 7) of approximately 11.4 m, which is within 0.1 m of the actual distance.

Figure 11:
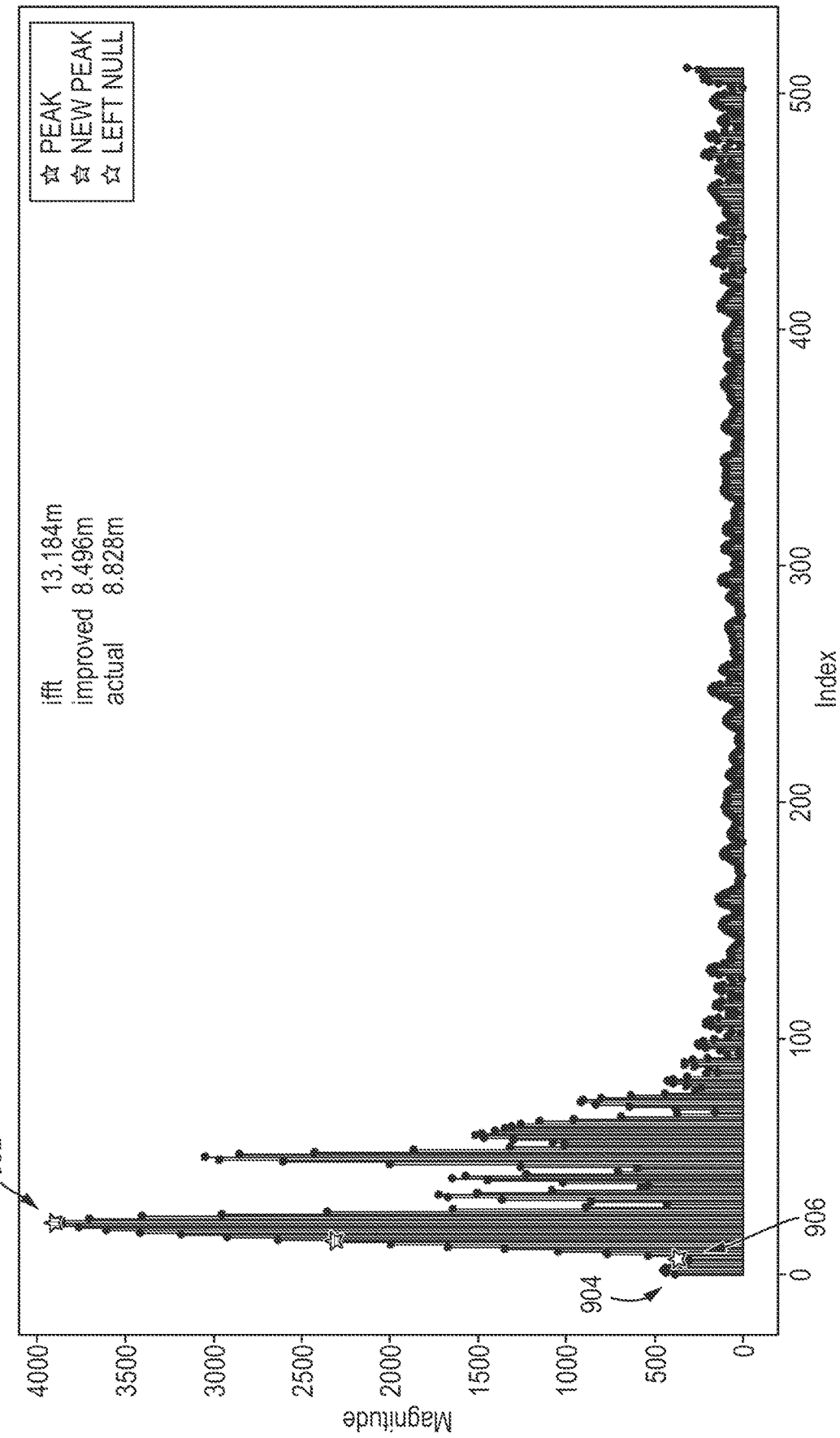
FIG. 11 is a simulated time domain channel response used in another embodiment of the invention.

FIG. 11 illustrates another simulated TDCR 900 in which the above described methods are implemented, produced from a situation where an RF device and a target are separated by 8.828 m. The TDCR 900 comprises a largest peak 902 located at an index corresponding to approximately 13.184 m (i.e. an error of 4.356 m). The amplitude of an earlier peak 904 is compared to a threshold based on the largest peak 902, but falls below this threshold, so the largest peak 902 is identified as the shortest path peak.

The closest local minimum 906 earlier than the shortest path peak 902 is then identified, and a time separation between the local minimum 906 and the shortest path peak 902 is compared to an expected time separation based on the bandwidth of signals transmitted between the RF device and the target. The time separation exceeds the expected time separation, and so a corrected time is determined by adding the expected time separation to the time of the local minimum. This corrected time is used to produce a final distance estimate of 8.496 m (i.e. an error of only 0.332 m).

Figure 12:
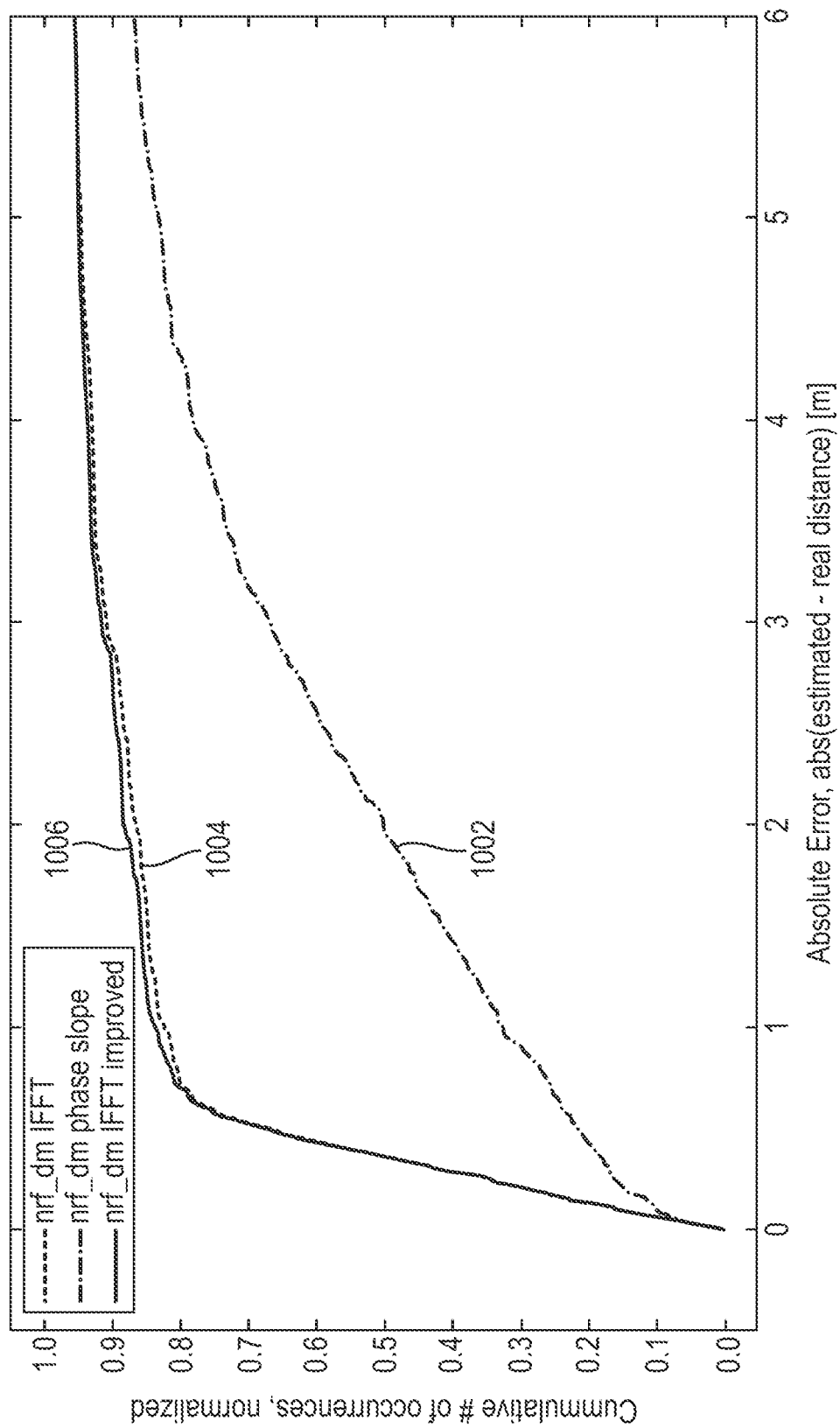
FIGS. 12 and 13 are simulated results illustrating the improved distance estimation performance of embodiments of the invention.

FIG. 12 shows simulation results in terms of a cumulative distribution function (CDF) of absolute distance estimation errors using a prior art approach and approaches according to embodiments of the invention. The simulation was performed using generated MCPD data from a Matlab model.

The lower line 1002 shows distance estimation error using a prior art phase slope (MCPD) approach. The middle line 1004 shows distance estimation error when a TDCR-based approach using the shortest path peak threshold test (i.e. as described above with reference to FIGS. 3-5) is used. The upper line 1006 shows distance estimation error when further local minimum analysis is used (i.e. as described above with reference to FIGS. 6-10). It can be seen that embodiments of the invention produce more accurate distances in the vast majority of simulations, with only roughly 20% of simulations resulting in an error above 1 m compared to roughly 65% for the prior art approach.

Figure 13:
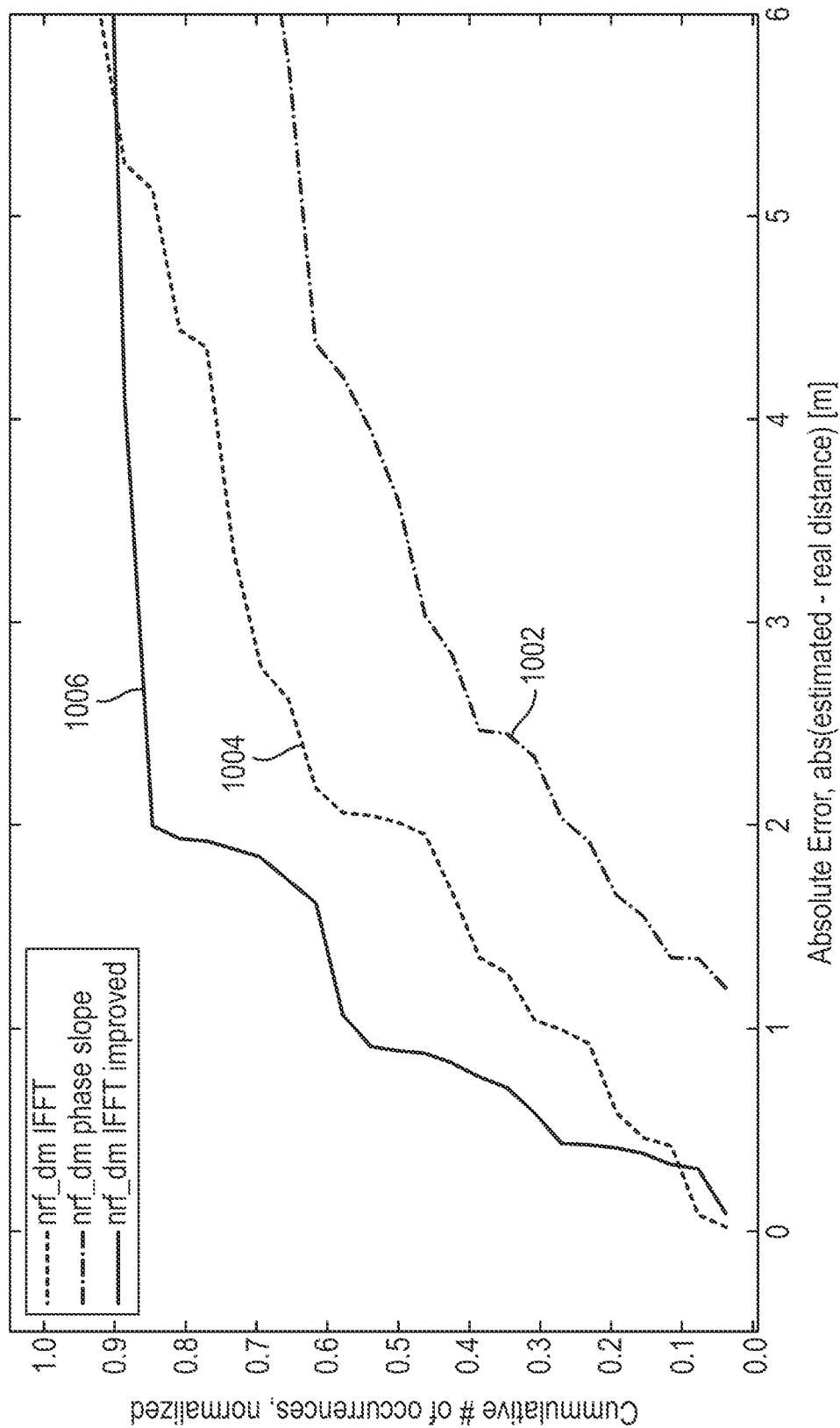

FIG. 13 shows the same simulation results as FIG. 12, but for only those simulations in which the local minimum analysis 1006 resulted in a correction to the time used for distance estimation (i.e. where the closest local minimum in the TDCR was greater than the expected time separation). In these cases, roughly 85% of simulations using the further local minimum analysis 1006 improvement result in an error of less than 2 m, compared to roughly 50% for simulations using just the shortest path peak threshold test 1004, and just 25% for the prior art MCPC approach 1002.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining a distance between a radio frequency device and a target, the method comprising:
   the radio frequency device receiving a radio frequency signal from the target;
   determining a time domain channel response from the received radio frequency signal;
   determining an amplitude of a largest peak in the time domain channel response;
   determining an amplitude of a second, earlier, peak in the time domain channel response;
   comparing the second peak amplitude to a threshold based on the largest peak amplitude;
   identifying the largest peak as a shortest path peak if the second peak amplitude is less than the threshold;
   identifying the second peak as a shortest path peak if the second peak amplitude is greater than the threshold;
   identifying a closest local minimum in the time domain channel response earlier than the shortest path peak;
   determining a time separation between the closest local minimum and the shortest path peak;
   comparing the time separation to an expected time separation based on a bandwidth of the received radio frequency signal;
   calculating the distance between the radio frequency device and the target based on a time corresponding to the shortest path peak; and
   if the time separation is greater than the expected time separation, calculating said time corresponding to the shortest path peak as a time corresponding to the closest local minimum plus the expected time separation.

2. The method of claim 1, wherein the radio frequency signal received from the target comprises a second radio frequency signal based on a first radio frequency signal transmitted previously to the target by the radio frequency device.

3. The method of claim 1, wherein the radio frequency signal comprises a plurality of frequencies.

4. The method of claim 3, wherein the radio frequency signal comprises a sequence of radio frequency signals having different carrier frequencies.

5. The method of claim 3, wherein the radio frequency signal comprises a bandwidth of at least 10 MHz.

6. The method of claim 1, wherein the target comprises a second radio frequency device that generates and transmits the radio frequency signal.

7. The method of claim 1, wherein the time domain channel response is determined using a frequency domain channel response of the received radio frequency signal.

8. The method of claim 7, wherein the radio frequency signal comprises a sequence of radio frequency signals having different carrier frequencies and producing the frequency domain channel response comprises measuring a phase of each of the radio frequency signals.

9. The method of claim 1, wherein the threshold corresponds to an amplitude larger than a side-lobe amplitude of the largest peak.

10. The method of claim 1, comprising calculating the distance between the radio frequency device and the target by determining the distance travelled by an RF signal in a time corresponding to the shortest path peak.

11. The method of claim 1, wherein the expected time separation comprises a Rayleigh criterion for the time domain channel response.

12. A radio frequency transceiver device arranged to:
receive a radio frequency signal from a target;
determine a time domain channel response from the radio frequency signal;
determine an amplitude of a largest peak in the time domain channel response;
determine an amplitude of a second, earlier, peak in the time domain channel response;
compare the second peak amplitude to a threshold based on the largest peak amplitude;
identify the largest peak as a shortest path peak if the second peak amplitude is less than the threshold;
identify the second peak as a shortest path peak if the second peak amplitude is greater than the threshold;
identify a closest local minimum in the time domain channel response earlier than the shortest path peak;
determine a time separation between the closest local minimum and the shortest path peak;
compare the time separation to an expected time separation based on a bandwidth of the received radio frequency signal;
calculate the distance between the radio frequency device and the target based on a time corresponding to the shortest path peak; and
if the time separation is greater than the expected time separation, calculate said time corresponding to the shortest path peak as a time corresponding to the closest local minimum plus the expected time separation.

13. A method of determining a distance between a radio frequency device and a target, the method comprising:
the radio frequency device transmitting a first radio frequency signal;
the radio frequency device receiving a second radio frequency signal from the target based on the first radio frequency signal;
determining a time domain channel response from the second radio frequency signal;
determining an amplitude of a largest peak in the time domain channel response;
determining an amplitude of a second, earlier, peak in the time domain channel response;
comparing the second peak amplitude to a threshold based on the largest peak amplitude;
identifying the largest peak as a shortest path peak if the second peak amplitude is less than the threshold;
identifying the second peak as a shortest path peak if the second peak amplitude is greater than the threshold;
identifying a closest local minimum in the time domain channel response earlier than the shortest path peak;
determining a time separation between the closest local minimum and the shortest path peak;
comparing the time separation to an expected time separation based on a bandwidth of the received radio frequency signal;
calculating the distance between the radio frequency device and the target based on a time corresponding to the shortest path peak; and
if the time separation is greater than the expected time separation, calculating said time corresponding to the shortest path peak as a time corresponding to the closest local minimum plus the expected time separation.

14. A radio frequency transceiver device arranged to:
transmit a first radio signal;
receive a second radio frequency signal from a target based on the first radio frequency signal;
determine a time domain channel response from the second radio frequency signal;
determine an amplitude of a largest peak in the time domain channel response;
determine an amplitude of a second, earlier, peak in the time domain channel response;
compare the second peak amplitude to a threshold based on the largest peak amplitude;
identify the largest peak as a shortest path peak if the second peak amplitude is less than the threshold;
identify the second peak as a shortest path peak if the second peak amplitude is greater than the threshold;
identify a closest local minimum in the time domain channel response earlier than the shortest path peak;
determine a time separation between the closest local minimum and the shortest path peak;
compare the time separation to an expected time separation based on a bandwidth of the received radio frequency signal;
calculate the distance between the radio frequency device and the target based on a time corresponding to the shortest path peak; and
if the time separation is greater than the expected time separation, calculate said time corresponding to the shortest path peak as a time corresponding to the closest local minimum plus the expected time separation.

* * * * *